US009965005B2

(12) United States Patent
Kim et al.

(10) Patent No.: US 9,965,005 B2
(45) Date of Patent: May 8, 2018

(54) MEMORY DIAGNOSIS SYSTEM

(71) Applicant: SAMSUNG ELECTRONICS CO., LTD., Suwon-si, Gyeonggi-Do (KR)

(72) Inventors: Kyung-Ryun Kim, Seoul (KR); Ki-Tae Park, Seongnam-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days. days.

(21) Appl. No.: 15/403,497

(22) Filed: Jan. 11, 2017

(65) Prior Publication Data
US 2017/0249227 A1  Aug. 31, 2017

(30) Foreign Application Priority Data

Feb. 26, 2016 (KR) .................. 10-2016-0022906

(51) Int. Cl.
G06F 1/20 (2006.01)
G06F 12/16 (2006.01)
G06F 11/07 (2006.01)
G06F 11/30 (2006.01)
G06F 11/32 (2006.01)

(52) U.S. Cl.
CPC .............. *G06F 1/20* (2013.01); *G06F 11/073* (2013.01); *G06F 11/3037* (2013.01); *G06F 11/3051* (2013.01); *G06F 11/321* (2013.01); *G06F 12/16* (2013.01)

(58) Field of Classification Search
CPC .. G06F 11/321; G06F 11/3051; G06F 11/073; G06F 11/3037
See application file for complete search history.

(56) References Cited

U.S. PATENT DOCUMENTS

| 6,910,106 | B2 | 6/2005 | Sechrest et al. |
| 8,335,886 | B2 | 12/2012 | Lee |
| 8,369,173 | B2 | 2/2013 | Kim et al. |
| 8,539,186 | B2 | 9/2013 | Sechrest et al. |
| 8,595,415 | B2 | 11/2013 | Van Aken et al. |
| 8,964,481 | B2 | 2/2015 | Oh et al. |
| 9,076,542 | B2 | 7/2015 | Sohn et al. |
| 2009/0164710 | A1 | 6/2009 | Choi et al. |
| 2010/0293439 | A1* | 11/2010 | Flynn .................. G06F 11/073 714/763 |

(Continued)

FOREIGN PATENT DOCUMENTS

| JP | 3839161 | 8/2006 |
| JP | 2006-293614 | 10/2006 |

(Continued)

*Primary Examiner* — Ajay Ojha
(74) *Attorney, Agent, or Firm* — F. Chau & Associates, LLC

(57) ABSTRACT

A memory diagnosis system includes a memory device and a server. The memory device includes a memory module configured to adjust operational parameters in response to a parameter control signal, a memory controller configured to generate the parameter control signal in response to a feedback signal, and a memory state monitor configured to monitor the memory module to generate an information signal that includes information on a state of the memory module. The server is configured to generate the feedback signal in response to the information signal.

18 Claims, 9 Drawing Sheets

(56) References Cited

U.S. PATENT DOCUMENTS

| | | | |
|---|---|---|---|
| 2011/0219274 A1* | 9/2011 | Cho | G06F 11/00 |
| | | | 714/708 |
| 2013/0138901 A1* | 5/2013 | Cordero | G06F 11/1658 |
| | | | 711/162 |
| 2013/0212207 A1 | 8/2013 | Ong | |
| 2016/0378149 A1* | 12/2016 | Kam | G06F 1/206 |
| | | | 713/320 |
| 2017/0060202 A1* | 3/2017 | Sundaram | G05D 23/193 |

FOREIGN PATENT DOCUMENTS

| | | |
|---|---|---|
| KR | 1020100050260 | 5/2010 |
| KR | 10-0972723 | 7/2010 |
| KR | 1020100097415 | 9/2010 |
| KR | 1020130063132 | 6/2013 |
| KR | 1020130093026 | 8/2013 |
| KR | 1020140070441 | 6/2014 |

\* cited by examiner

MEMORY DIAGNOSIS SYSTEM

CROSS-REFERENCE TO RELATED APPLICATION

This U.S. nonprovisional patent application claims priority under 35 U.S.C. § 119 to Korean Patent Application No. 10-2016-0022906, filed on Feb. 26, 2016 in the Korean Intellectual Property Office (KIPO), the disclosure of which is incorporated by reference herein in its entirety.

TECHNICAL FIELD

Exemplary embodiments of the inventive concept relate to semiconductor integrated circuits, and more particularly to a memory diagnosis system for diagnosing a memory device based on monitoring information of the memory device.

DISCUSSION OF RELATED ART

Memory devices have a limited lifespan because they degenerate over time. Nonvolatile memory devices may lose data as they near the end of their lifespan.

SUMMARY

According to an exemplary embodiment of the inventive concept, a memory diagnosis system includes a memory device and a server. The memory device includes a memory module configured to adjust operational parameters in response to a parameter control signal, a memory controller configured to generate the parameter control signal in response to a feedback signal, and a memory state monitor configured to monitor the memory module to generate an information signal that includes information on a state of the memory module. The server generates the feedback signal in response to the information signal.

According to an exemplary embodiment of the inventive concept, a memory diagnosis system includes a memory device and a server. The memory device includes a memory module and a memory state monitor configured to monitor the memory module to generate an information signal that includes information on a state of the memory module and configured to generate a malfunction alert of the memory module in response to a feedback signal. The server receives the information signal and generates the feedback signal, which indicates a malfunction of the memory module, by using the information on the state of the memory module.

According to an exemplary embodiment of the inventive concept, a method of diagnosing a memory module included in a memory device includes determining a bit error rate from an information signal transmitted from the memory device, determining whether the bit error rate is higher than a first reference value, activating a feedback signal to warn of a danger of malfunction of the memory module when the bit error rate is higher than the first reference value, and transmitting the feedback signal to the memory device.

BRIEF DESCRIPTION OF THE DRAWINGS

The above and other features of the inventive concept will be more clearly understood by describing in detail exemplary embodiments thereof with reference to the accompanying drawings.

DETAILED DESCRIPTION OF THE EMBODIMENTS

Figure 1:
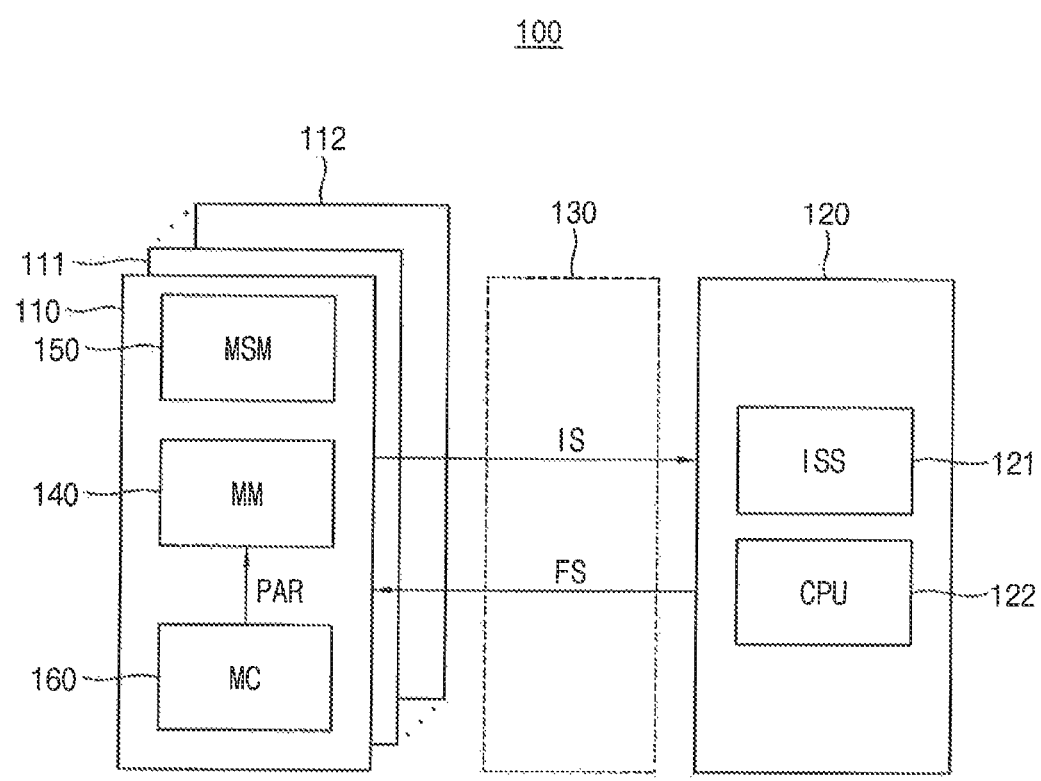
FIG. 1 is a block diagram illustrating a memory diagnosis system according to an exemplary embodiment of the inventive concept.

Exemplary embodiments of the inventive concept will be described more fully hereinafter with reference to the accompanying drawings. In the drawings, like reference numerals refer to like elements throughout. Repeat descriptions may be omitted.

Exemplary embodiments of the inventive concept may provide a memory diagnosis system that determines a usage pattern of a memory device based on monitoring information of the memory device and optimizes the memory device based on the usage pattern.

Exemplary embodiments of the inventive concept may provide a memory diagnosis system that determines a possibility of malfunction of a memory device based on monitoring information of the memory device and warns a user of a danger of malfunction of the memory device based on the possibility of the malfunction.

FIG. 1 is a block diagram illustrating a memory diagnosis system according to an exemplary embodiment of the inventive concept.

Referring to FIG. 1, a memory diagnosis system 100 may include a memory device 110, a central server 120, and a communication channel 130. According to exemplary embodiments of the inventive concept, the memory diagnosis system 100 may further include additional memory devices 111 and 112. The additional memory devices 111 and 112 may have a configuration equal to or similar to the configuration of the memory device 110. As such, the central server 120 may communicate and interact with the memory device 110 and the additional memory devices 111 and 112 in a similar manner.

The memory device 110 may include a memory module (MM) 140, a memory state monitor (MSM) 150, and a memory controller (MC) 160. The memory module 140 may adjust operational parameters in response to a parameter control signal PAR. The memory controller 160 may generate the parameter control signal PAR based on a feedback signal FS. The memory state monitor 150 may monitor the memory module 140 to generate an information signal IS that includes information on a state of the memory module 140. The memory module 140 may include a nonvolatile memory such as a flash memory and a volatile memory such as a dynamic random access memory (DRAM).

According to exemplary embodiments of the inventive concept, the information on the state of the memory module 140 may include a temperature in the memory module 140, a humidity in the memory module 140, a pattern and frequency of program, erase, and read commands applied to the memory module 140, etc.

The central server 120 may collect the information through the information signal IS and generate the feedback signal FS, for adjusting the operational parameters, based on the collected information. According to exemplary embodiments of the inventive concept, the feedback signal FS may represent a usage pattern of the memory module 140. According to exemplary embodiments of the inventive concept, the central server 120 may include an information collector (ISS) 121 and a central processing unit (CPU) 122. The information collector 121 may collect and store the information on the state of the memory module 140 based on the information signal IS. The central processing unit 122 may generate the feedback signal FS, for adjusting the operational parameters of the memory module 140, based on the collected information.

The memory state monitor 150 may transfer the information signal IS through the communication channel 130 to the central server 120, and the central server 120 may transfer the feedback signal FS through the communication channel 130 to the memory device 110.

According to exemplary embodiments of the inventive concept, the collected information in the information collector 121 may be used as test information for designing another memory module and/or for supplementing a previous design. According to exemplary embodiments of the inventive concept, the information may be collected while the memory device 110 is used by an end user, e.g., after the memory device 110 is sold as finished goods. The communication channel 130 may be an internet network or a cloud network.

Figure 2:
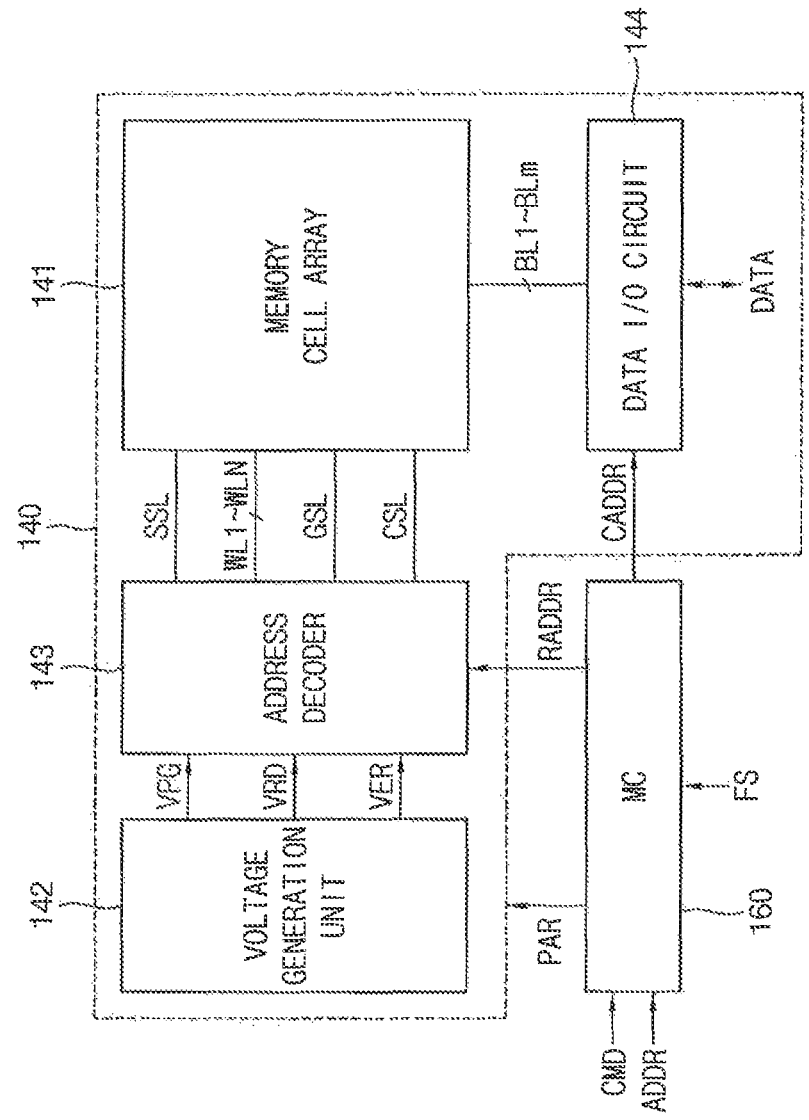
FIG. 2 is a diagram illustrating a memory module and a memory controller in the memory diagnosis system of FIG. 1 according to an exemplary embodiment of the inventive concept.

FIG. 2 is a diagram illustrating a memory module and a memory controller in the memory diagnosis system of FIG. 1 according to an exemplary embodiment of the inventive concept.

Referring to FIG. 2, the memory module 140 may include a memory cell array 141, a voltage generation circuit 142, an address decoder 143, and a data I/O circuit 144.

The memory controller 160 may generate a row address signal RADDR and a column address signal CADDR, based on a command signal CMD and an address signal ADDR, to operate the memory cell array 141. The memory controller 160 may generate and change the parameter control signal PAR based on the feedback signal FS. The parameter control signal PAR may include a DC characteristic control signal for controlling DC characteristics of the memory module 140, such as DC levels of signals and voltages, and an AC characteristic control signal for controlling AC characteristics of the memory module 140, such as timings and time periods of signals.

The voltage generation circuit 142 may generate operational voltages, such as a read voltage VRD, a program voltage VPG, or an erase voltage VER, based on the parameter control signal PAR.

The address decoder 143 may apply corresponding voltages to a string selection line SSL, wordlines WL1~WLN, a ground selection line GSL, and a common source line CSL based on the row address signal RADDR and the command signal CMD.

The memory cell array 141 may include a single level cell SLC storing one data bit and/or a multi-level cell MLC storing two or more data bits.

The data I/O circuit 144 may receive read data from and apply write data to the memory cells of the memory cell array 141 through bitlines BL1~BLm in response to the column address signal CADDR.

The memory cell array 141 may be implemented in a two-dimensional structure or a three-dimensional structure. An exemplary embodiment of the three-dimensional structure is described with reference to FIGS. 3A and 3B.

Figure 3A:
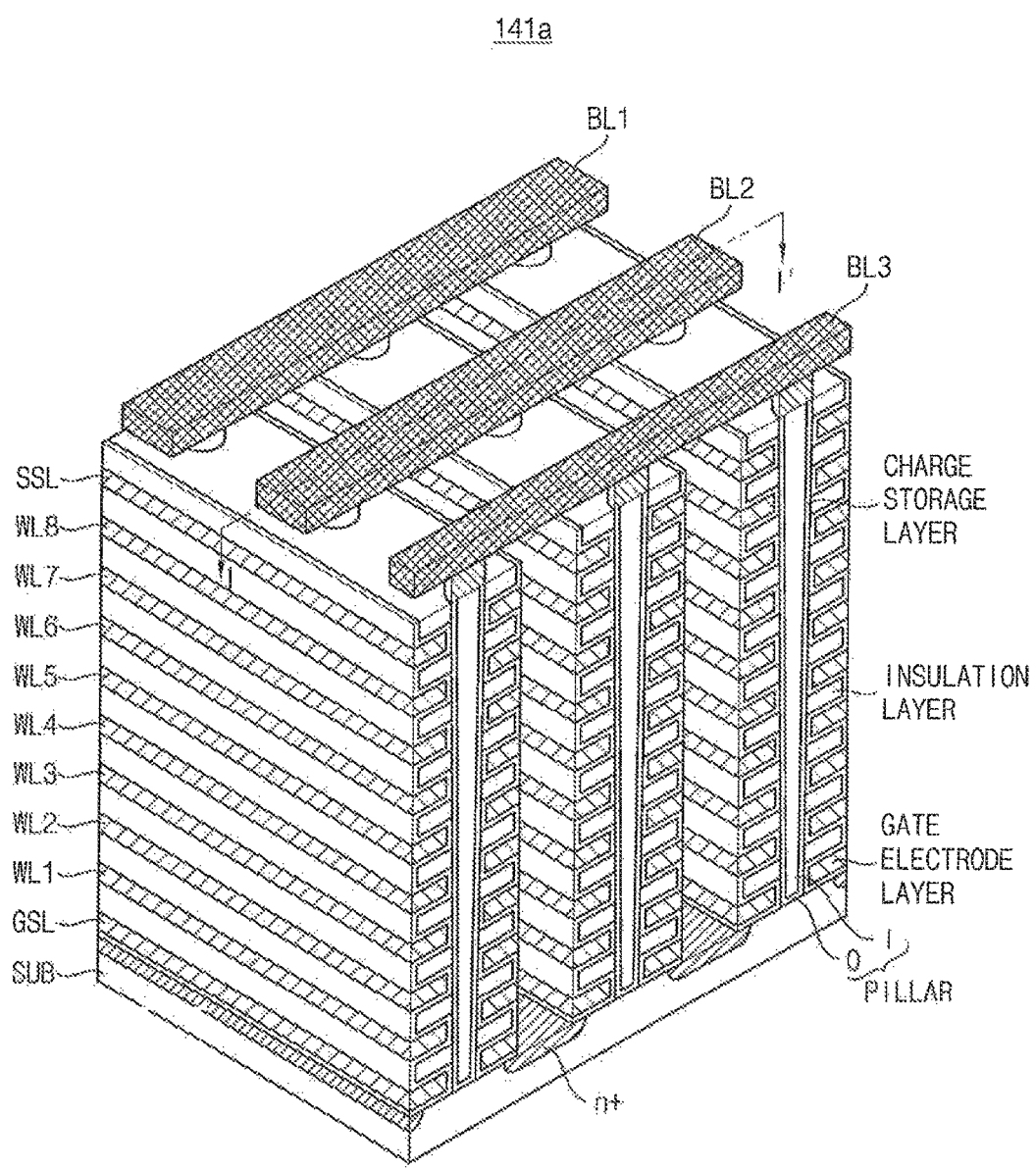
FIG. 3A is a perspective view illustrating an exemplary embodiment of a memory cell array included in the memory module of FIG. 2 as implemented with a three-dimensional structure.

FIG. 3A is a perspective view illustrating an exemplary embodiment of a memory cell array included in the memory module of FIG. 2 as implemented with a three-dimensional structure.

Referring to FIG. 3A, a memory cell array 141*a* may be formed in a direction perpendicular to a substrate SUB. An n+ doped region may be formed in the substrate SUB. A gate electrode layer and an insulation layer may be alternately deposited on the substrate SUB. In addition, a charge storage layer may be formed between the gate electrode layer and the insulation layer.

When the gate electrode layer and the insulation layer are vertically patterned, a V-shaped pillar may be formed. The pillar may penetrate the gate electrode layer and the insulation layer to be connected to the substrate SUB. The outer portion O of the pillar may be configured with a channel semiconductor, and the inner portion I of the pillar may be configured with an insulation material such as silicon oxide.

The gate electrode layer may be connected to the ground selection line GSL, the plurality of wordlines WL1 to WL8, and the string selection line SSL. The pillar may be connected to the plurality of bitlines BL1 to BL3.

It is illustrated in FIG. 3A that the memory cell array 141*a* has the ground selection line GSL, the string selection line SSL, the eight wordlines WL1 to WL8, and the three bitlines BL1 to BL3 as an example. However, the inventive concept is not limited thereto.

Figure 3B:
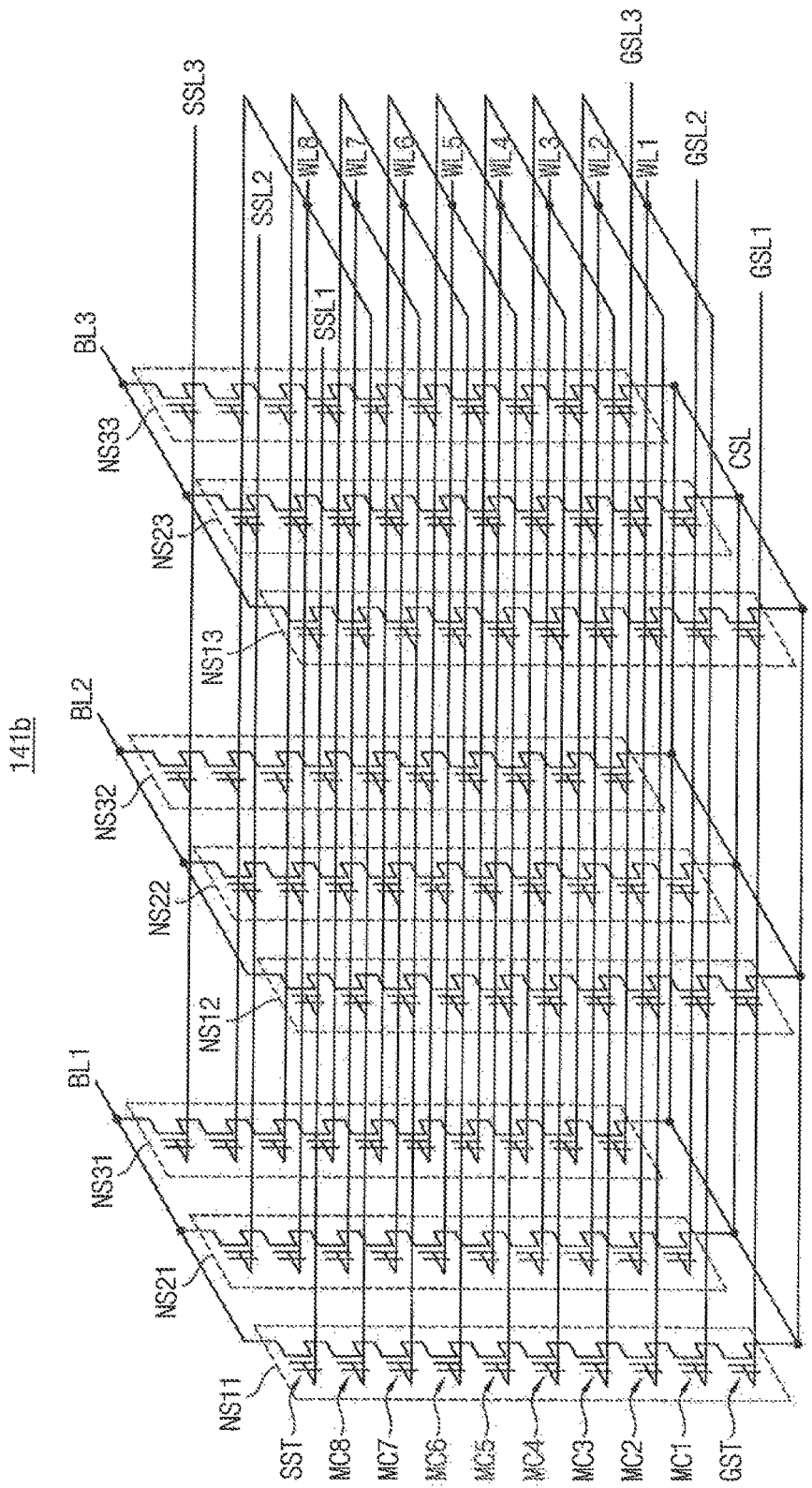
FIG. 3B is a circuit diagram illustrating an equivalent circuit of the memory cell array of FIG. 3A according to an exemplary embodiment of the inventive concept.

FIG. 3B is a circuit diagram illustrating an equivalent circuit of the memory cell array of FIG. 3A according to an exemplary embodiment of the inventive concept.

Referring to FIG. 3B, in a memory cell array 141*b*, NAND strings NS11 to NS33 may be connected between the bitlines BL1 to BL3 and a common source line CSL. Each NAND string (e.g., NS11) may include a string selection transistor SST, a plurality of memory cells MC1 to MC8, and a ground selection transistor GST.

The string selection transistor SST may be connected to one of string selection lines SSL1 to SSL3. The plurality of memory cells MC1 to MC8 may be connected to corresponding wordlines WL1 to WL8, respectively. The ground selection transistor GST may be connected to one of ground selection lines GSL1 to GSL3. Additionally, the string selection transistor SST may be connected to one of the bitlines BL1 to BL3, and the ground selection transistor GST may be connected to the common source line CSL.

Wordlines (e.g., WL1) having the same height may be commonly connected, while the ground selection lines GSL1 to GSL3 and the string selection lines SSL1 to SSL3 may be separated. For example, a physical page may include memory cells connected to the first wordline WL1 and included in the NAND strings NS11, NS12, and NS13. When this physical page is programmed, the first wordline WL1, the first string selection line SSL1, and the first ground selection line GSL1 may be selected.

Figure 4A:
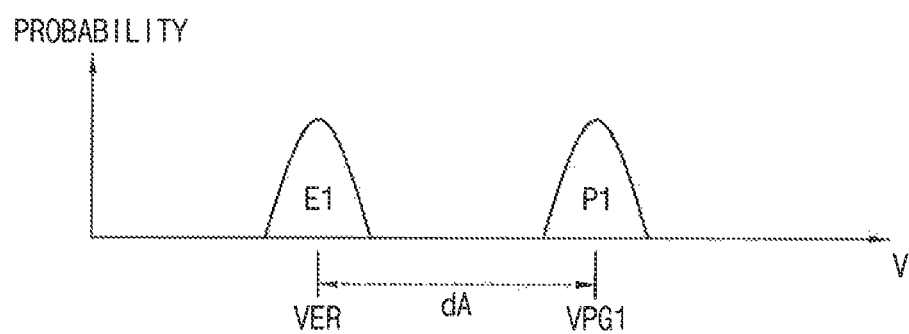
FIGS. 4A and 4B are diagrams illustrating threshold voltage distributions of memory cells in a memory module depending on a program voltage, according to an exemplary embodiment of the inventive concept.
Figure 4B:
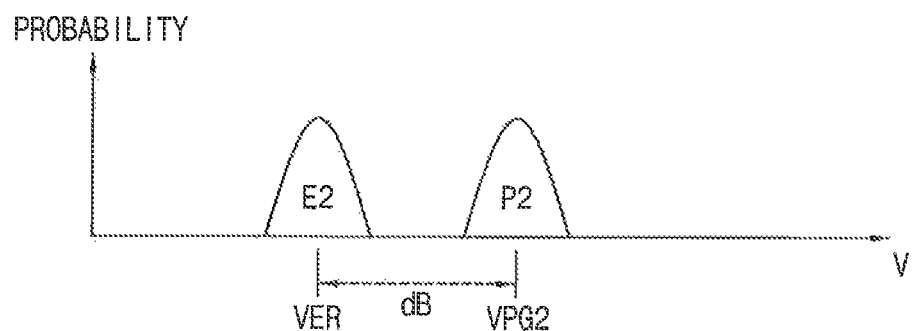

FIGS. 4A and 4B are diagrams illustrating threshold voltage distributions of memory cells in a memory module depending on a program voltage, according to an exemplary embodiment of the inventive concept.

FIG. 4A illustrates threshold voltage distributions of an erased state E1 erased by an erase voltage VER and a programmed state P1 programmed by a first program voltage VPG1 in a situation when the information signal IS indicates that program commands are applied to the memory module 140 at a frequency lower than a low threshold frequency. The low threshold frequency may be set to a predetermined value.

When the program commands are applied to the memory module 140 occasionally or infrequently, data retention time is relatively long. Based on the information signal IS, the central server 120 may determine that a usage pattern of the memory module 140 is a low frequency program pattern and may generate the feedback signal FS to correspond to the low frequency program pattern. In response to the feedback signal FS representing the low frequency program pattern, the memory controller 160 may increase the first program voltage VPG1, for programming data in the memory module 140, to increase the data retention time. Errors in the read operation may be reduced by increasing the data retention time. However, degeneration of the memory cells may increase, resulting in a decrease in a total program and erase cycle number.

FIG. 4B illustrates threshold voltage distributions of an erased state E2 erased by an erase voltage VER and a programmed state P2 programmed by a second program voltage VPG2 in a situation when the information signal IS indicates that the program commands are applied to the memory module 140 at a frequency higher than a high threshold frequency. The high threshold frequency may be set to a predetermined value.

When the program commands are applied to the memory module 140 frequently, the data retention time may be relatively short. Based on the information signal IS, the central server 120 may determine that a usage pattern of the memory module 140 is a high frequency program pattern and may generate the feedback signal FS to correspond to the high frequency program pattern. In response to the feedback signal FS representing the high frequency program pattern, the memory controller 160 may decrease the second program voltage VPG2, for programming data in the memory module 140, to decrease the data retention time.

The second program voltage VPG2 is lower than the first program voltage VPG1. In other words, a difference dB between the second program voltage VPG2 and the erase voltage VER is smaller than a difference dA between the first program voltage VPG1 and the erase voltage VER. In contrast to FIG. 4A described above, in FIG. 4B, as the program voltage (e.g., the second program voltage VPG2) is decreased, errors in the read operation may be increased by decreasing the data retention time. On the other hand, degeneration of the memory cells may be decreased and thus, the total program and erase cycle number may be increased.

Figure 5:
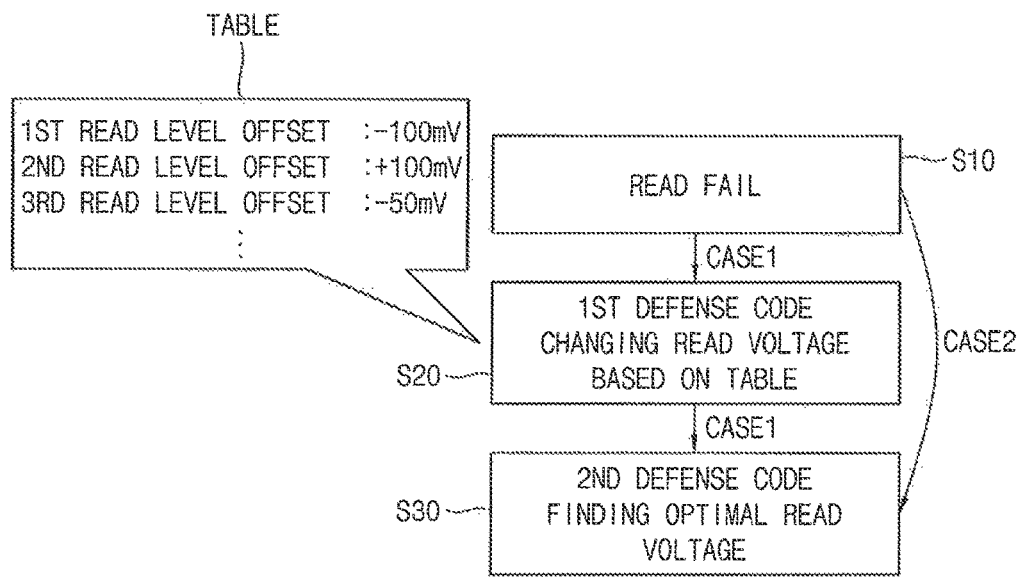
FIG. 5 is diagram illustrating a method of performing defense codes in a memory device in the memory diagnosis system of FIG. 1 when a read operation is failed, according to an exemplary embodiment of the inventive concept.

FIG. 5 is diagram illustrating a method of performing defense codes in a memory device in the memory diagnosis system of FIG. 1 when a read operation is failed, according to an exemplary embodiment of the inventive concept.

Referring to FIG. 5, in a normal case CASE1, when the read operation is failed (READ FAIL, S10) due to an error rate in the read operation exceeding a reference value, the memory device 110 tries a first defense code to change a read voltage based on values in a lookup table (S20). For example, the memory device 110 may retry the read operation after a first read fail by reducing the read voltage VRD by about 100 mV (millivolt), retry the read operation after a second read fail by increasing the read voltage VRD by about 100 mV, and retry the read operation after a third read fail by decreasing the read voltage VRD by about 50 mV, according to the read level offsets illustrated in FIG. 5. However, the inventive concept is not limited thereto and the values in the lookup table may be set differently from the values of FIG. 5. If the read operation is still failed after the first defense code, the memory device 110 may perform a second defense code to find an optimal read voltage to minimize errors in the read operation (S30).

According to an exemplary embodiment of the inventive concept, in a case CASE2 when the information signal IS indicates that a bit error rate in a read operation exceeds a reference value and the read operation is failed (S10), the memory device 110 may omit the first defense code (S20) because the first defense code cannot efficiently reduce the errors in the read operation, and may directly perform the second defense code (S30).

Figure 6:
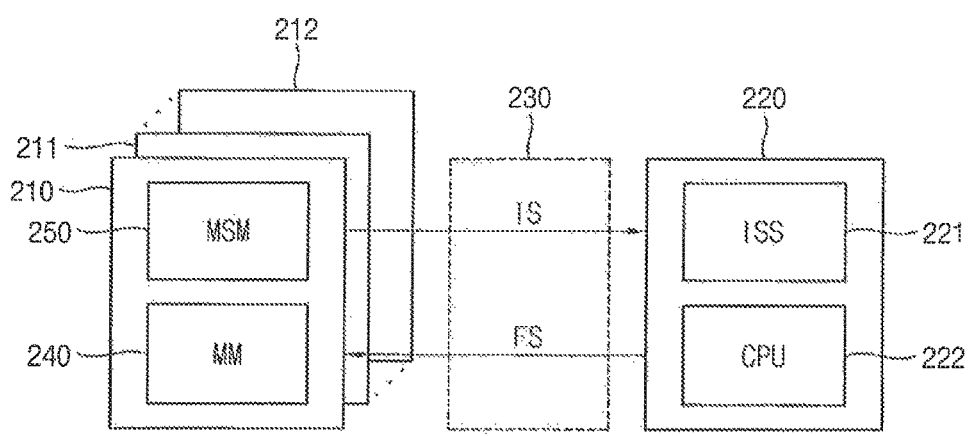
FIG. 6 is a block diagram illustrating a memory diagnosis system according to an exemplary embodiment of the inventive concept.

FIG. 6 is a block diagram illustrating a memory diagnosis system according to an exemplary embodiment of the inventive concept.

Referring to FIG. 6, a memory diagnosis system 200 may include a memory device 210, a central server 220, and a communication channel 230. The memory device 210 may include a memory module MM 240 and a memory state monitor 250. According to exemplary embodiments of the inventive concept, the memory diagnosis system 200 may further include additional memory devices 211 and 212. The additional memory devices 211 and 212 may have a configuration equal to or similar to the configuration of the memory device 210 and thus, repeat descriptions are omitted.

The memory state monitor 250 may monitor the memory module 240 to generate the information signal IS that includes information on a state of the memory module 240. A user may be warned of a danger of malfunction of the memory module 240 based on the feedback signal FS. The memory module 240 may include a nonvolatile memory such as a flash memory and a volatile memory such as a dynamic random access memory (DRAM).

According to exemplary embodiments of the inventive concept, the information on the state of the memory module 240 may include a present program and erase cycle number, a bit error rate in a read operation, a program time, and/or an execution number of defense codes for reducing errors in the read operation.

The central server 220 may collect the information through the information signal IS and may generate the feedback signal FS indicating a possibility of malfunction of the memory module 240 based on the collected information. According to exemplary embodiments of the inventive concept, the central server 220 may include an information collector ISS 221 and a central processing unit CPU 222. The information collector 221 may collect and store the information on the state of the memory module 240, based on the information signal IS. The central processing unit 222 may generate the feedback signal FS indicating the possibility of malfunction of the memory module 240 based on the collected information.

The memory state monitor 250 may transfer the information signal IS through the communication channel 230 to the central server 220, and the central server 220 may transfer the feedback signal FS through the communication channel 230 to the memory device 210.

According to exemplary embodiments of the inventive concept, the collected information in the information collector 221 may be used as test information for designing another memory module and/or for supplementing the previous design. According to exemplary embodiments of the inventive concept, the information may be collected while the memory device 210 is used by an end user, e.g., after the memory device 210 is sold as finished goods. The communication channel 230 may be an internet network or a cloud network.

Figure 7:
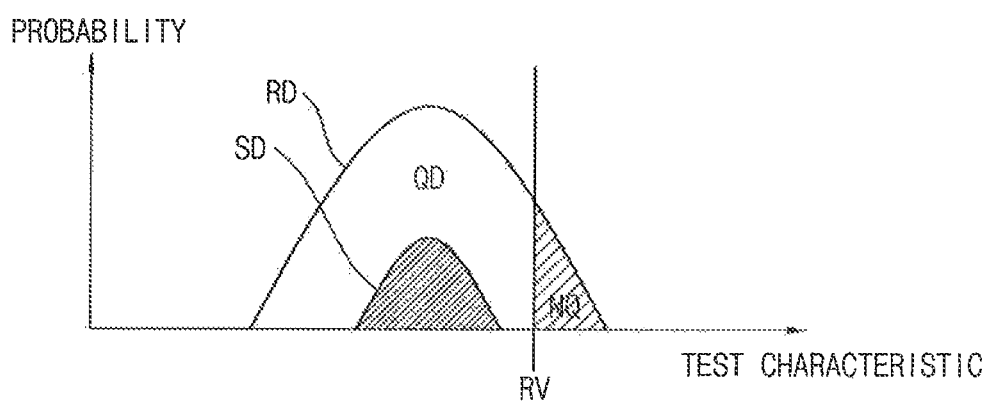
FIG. 7 is a diagram illustrating a probability distribution of characteristics of the memory diagnosis system of FIG. 6 according to an exemplary embodiment of the inventive concept.

FIG. 7 is a diagram illustrating a probability distribution of characteristics of the memory diagnosis system of FIG. 6 according to an exemplary embodiment of the inventive concept.

Referring to FIG. 7, a complete test of all mass-produced memory devices would take too much time and thus, a sample distribution SD may be obtained with respect to a sample of the memory devices to predict a real distribution RD with respect to an entire group of memory devices.

When the test characteristic is a bit error rate BER, a memory device having a bit error rate BER lower than a reference value RV may be considered a normal product QD and a memory device having a bit error rate BER higher than the reference value RV may be considered a defective product NQ. In FIG. 7, all of the memory devices in the sample distribution may be determined as the normal products QD, but some memory devices in the real distribution RD may be determined as the defective products NQ.

The central processing unit 222 in the central server 220 may determine that the possibility of the malfunction is high when the bit error rate BER, included in the information signal IS, is higher than the reference value RV. In this case, the central server 220 may activate the feedback signal FS and the memory device 210 may warn the user of the danger of malfunction of the memory module 240. In contrast, the central processing unit 222 in the central server 220 may determine that the possibility of the malfunction is low when the bit error rate BER is lower than the reference value RV. In this case, the central server 220 may deactivate the feedback signal FS and the memory device 210 may inform the user that the memory module 240 is in a normal state.

According to exemplary embodiments of the inventive concept, the central server 220 may generate the feedback signal FS, indicating the possibility of malfunction of the memory module 240, based on the present program and erase cycle number, the program time, and/or the execution number of defense codes for reducing errors in the read operation, in substantially the same way as generating the feedback signal FS based on the bit error rate BER, described above.

Referring to FIGS. 4A, 4B, 5, and 7, according to an exemplary embodiment of the inventive concept, a plurality of reference values may be set to determine whether to adjust operational parameters of the memory module and/or warn of malfunction of the memory module. As described above, the information signal IS may include the bit error rate BER, the frequency that program commands are applied to the memory module, the present program and erase cycle number, the program time, the execution number of defense codes, etc.

The bit error rate BER may be compared with a first reference value (e.g., the reference value RV of FIG. 7) to determine whether to activate a feedback signal to warn of a danger of malfunction of the memory module, as described with reference to FIG. 7. Additionally, the bit error rate BER may be compared with a second reference value and a third reference value. The second reference value may be less than the third reference value, and the third reference value may be less than the first reference value. The second reference value and third reference value may indicate a failure of a read operation, but malfunction is not imminent and the read operation may be retried. In other words, if the bit error rate BER is between the second and third reference value, the first defense code may be performed and the second defense code may be performed if needed, as described with reference to FIG. 5. If the bit error rate BER is higher than the third reference value, the first defense code may be omitted and the second defense code may be performed, as described with reference to FIG. 5.

Furthermore, the frequency that program commands are applied to the memory module (included in the information signal IS) may be compared to a first threshold frequency (e.g., the low threshold frequency) and a second threshold frequency (e.g., the high threshold frequency). The program voltage may be adjusted accordingly based on the results of the comparison, as described with reference to FIGS. 4A and 4B.

Figure 8:
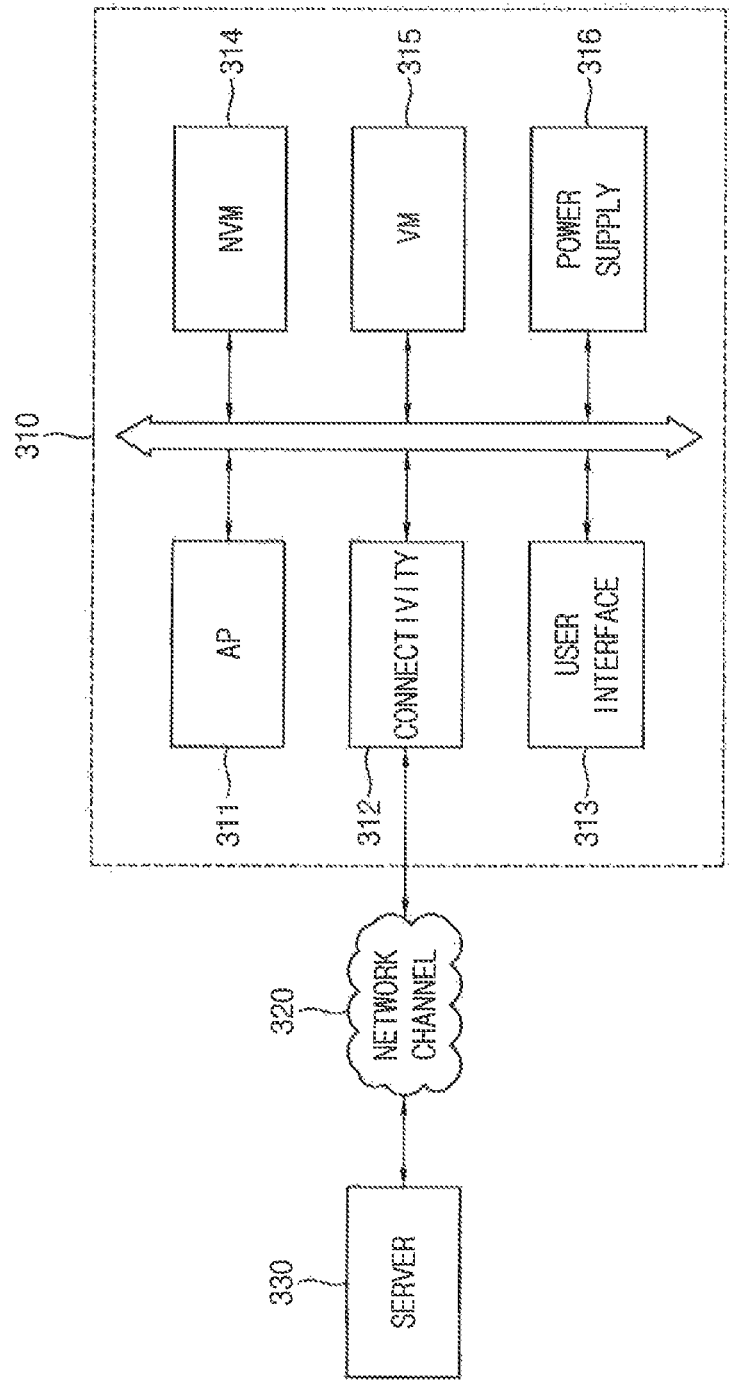
FIG. 8 is a block diagram illustrating a mobile system according to an exemplary embodiment of the inventive concept.

FIG. 8 is a block diagram illustrating a mobile system according to an exemplary embodiment of the inventive concept.

Referring to FIG. 8, a mobile system 310 includes an application processor (AP) 311, a connectivity unit 312, a user interface 313, a nonvolatile memory device (NVM) 314, a volatile memory device (VM) 315, and a power supply 316. The devices may communicate via a bus.

According to exemplary embodiments of the inventive concept, the mobile system 310 may be a mobile phone, a smart phone, a personal digital assistant (PDA), a portable multimedia player (PMP), a digital camera, a music player, a portable game console, a navigation system, etc.

The application processor 311 may execute applications, such as a web browser, a game application, a video player, etc. According to exemplary embodiments of the inventive concept, the application processor 311 may include a single core or multiple cores. For example, the application processor 311 may be a multi-core processor, such as a dual-core processor, a quad-core processor, a hexa-core processor, etc. The application processor 311 may include an internal or external cache memory.

The connectivity unit 312 may perform wired or wireless communication with an external device. For example, the connectivity unit 312 may perform Ethernet communication, near field communication (NFC), radio frequency identification (RFID) communication, mobile telecommunication, memory card communication, universal serial bus (USB) communication, etc. According to exemplary embodiments of the inventive concept, the connectivity unit 312 may include a baseband chipset that supports communications, such as global system for mobile communications (GSM), general packet radio service (GPRS), wideband code division multiple access (WCDMA), high speed downlink/ uplink packet access (HSxPA), etc. The connectivity unit 312 may communicate with a server 330 through a network channel 320.

According to exemplary embodiments of the inventive concept, the nonvolatile memory device 314 or the volatile memory device 315 may correspond to the memory device 110 in FIG. 1, the network channel 320 may correspond to the communication channel 130 in FIG. 1, and the server 330 may correspond to the central server 120 in FIG. 1. According to exemplary embodiments of the inventive concept, the nonvolatile memory device 314 or the volatile memory device 315 may correspond to the memory device 210 in FIG. 6, the network channel 320 may correspond to the communication channel 230 in FIG. 6, and the server 330 may correspond to the central server 220 in FIG. 6.

The nonvolatile memory device 314 may store a boot image for booting the mobile system 310. The nonvolatile memory device 314 may include a memory cell array formed on a substrate in a three-dimensional structure (e.g., as described with reference to FIG. 3A). Memory cells included in the memory cell array may be formed in a direction perpendicular to the substrate. The memory cells included in the memory cell array may be connected to a plurality of wordlines, which are stacked in a direction perpendicular to the substrate, and a plurality of bitlines, which are formed in a direction parallel to the substrate.

The volatile memory device 315 may store data processed by the application processor 311, or may operate as a working memory. The user interface 313 may include at least one input device, such as a keypad, a touch screen, etc., and at least one output device, such as a speaker, a display device, etc. The power supply 316 may provide a power supply voltage to the mobile system 310.

According to exemplary embodiments of the inventive concept, the mobile system 310 may further include an image processor and/or a storage device, such as a memory card, a solid state drive (SSD), a hard disk drive (HDD), a CD-ROM, etc.

According to exemplary embodiments of the inventive concept, the mobile system 310 and/or components of the mobile system 310 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline integrated circuit (SOIC), shrink small outline package (SSOP), thin small outline package (TSOP), system in package (SIP), multi-chip package (MCP), wafer-level fabricated package (WFP), or wafer-level processed stack package (WSP).

Figure 9:
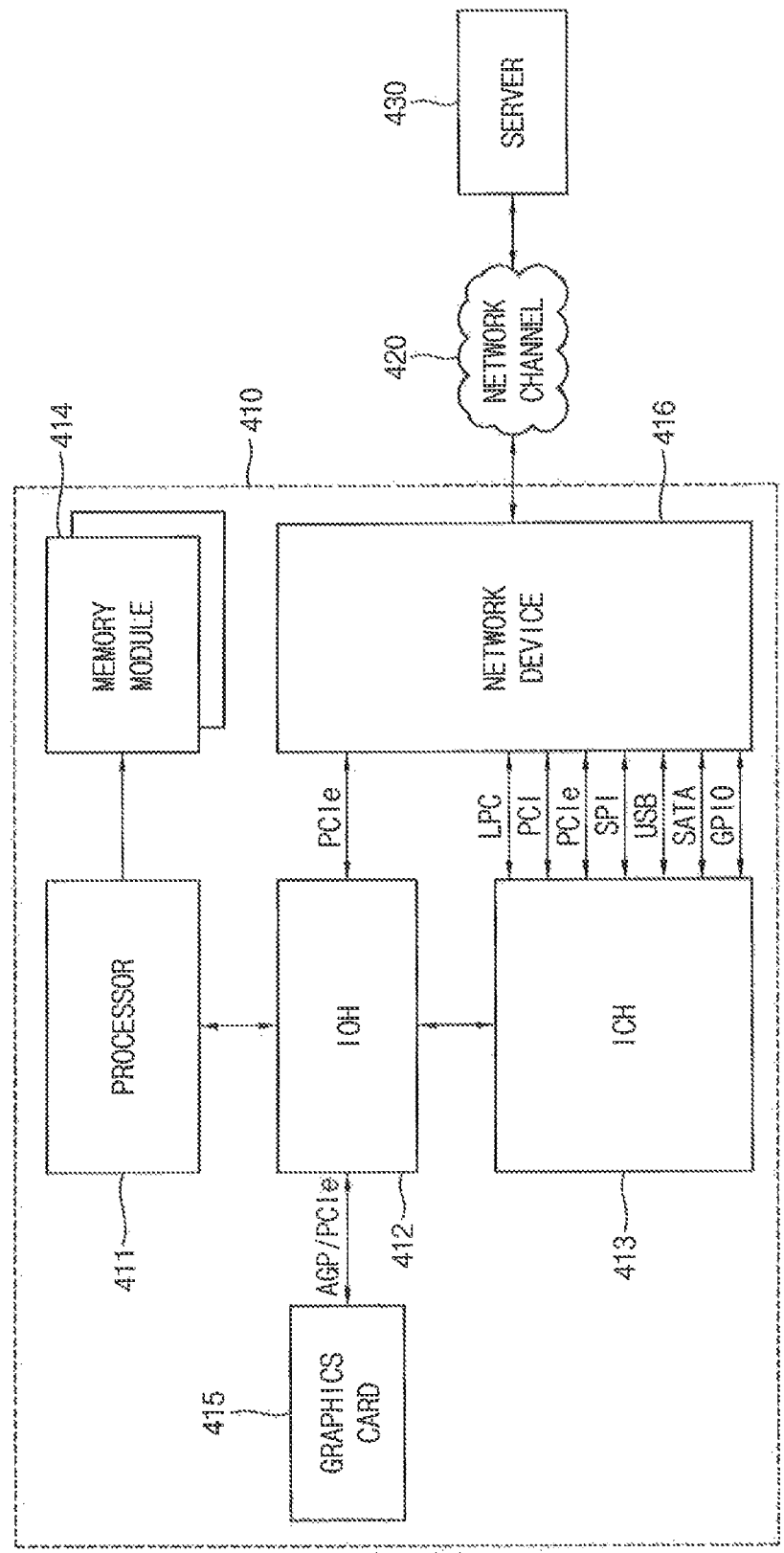
FIG. 9 is a block diagram illustrating a computing system according to an exemplary embodiment of the inventive concept.

FIG. 9 is a block diagram illustrating a computing system according to an exemplary embodiments of the inventive concept.

Referring to FIG. 9, a computing system 410 includes a processor 411, an input/output hub (IOH) 412, an input/output controller hub (ICH) 413, at least one memory module 414, a network device 416, and a graphics card 415. According to exemplary embodiments of the inventive concept, the computing system 410 may be a personal computer (PC), a server computer, a workstation, a laptop computer, a mobile phone, a smart phone, a PDA, a PMP, a digital camera, a digital television, a set-top box, a music player, a portable game console, a navigation system, etc.

The processor 411 may perform various computing functions, such as executing specific software for performing specific calculations or tasks. For example, the processor 310 may be a microprocessor, a central processing unit (CPU), a digital signal processor, or the like. According to exemplary embodiments of the inventive concept, the processor 411 may include a single core or multiple cores. For example, the processor 411 may be a multi-core processor, such as a dual-core processor, a quad-core processor, a hexa-core processor, etc. Although FIG. 9 illustrates the computing system 410 including one processor 411, the computing system 410 may include a plurality of processors.

The processor 411 may include a memory controller for controlling operations of the memory module 414. The memory controller included in the processor 411 may be referred to as an integrated memory controller (IMC). A memory interface between the memory controller and the memory module 414 may be implemented with a single channel including a plurality of signal lines, or may be implemented with multiple channels. At least one memory module 414 may be coupled to an individual channel. According to exemplary embodiments of the inventive concept, the memory controller may be located inside the input/output hub 412. The input/output hub 412 including an internal memory controller may be referred to as a memory controller hub (MCH).

The input/output hub 412 may manage data transfer between the processor 411 and other devices, such as the graphics card 415. The input/output hub 412 may be coupled to the processor 411 via various interfaces. For example, the interface between the processor 411 and the input/output hub 412 may be a front side bus (FSB), a system bus, a HyperTransport, a lightning data transport (LDT), a Quick-Path interconnect (QPI), a common system interface (CSI), etc. The input/output hub 412 may provide various interfaces to connect with devices. For example, the input/output hub 412 may provide an accelerated graphics port (AGP) interface, a peripheral component interconnect-express (PCIe) interface, a communications streaming architecture (CSA) interface, etc. The input/output hub 412 may be coupled to the network device 416 via PCIe, as an example. Although FIG. 9 illustrates the computing system 410 including one input/output hub 412, the computing system 410 may include a plurality of input/output hubs.

The graphics card 415 may be coupled to the input/output hub 412 via AGP or PCIe. The graphics card 415 may control a display device for displaying an image. The graphics card 415 may include an internal processor for processing image data and an internal memory device. According to exemplary embodiments of the inventive concept, the input/output hub 412 may include an internal graphics device along with or instead of the graphics card 415. The internal graphics device included in the input/output hub 412 may be referred to as integrated graphics. Further, the input/output hub 412 including the internal memory controller and the internal graphics device may be referred to as a graphics and memory controller hub (GMCH).

The input/output controller hub 413 may perform data buffering and interface arbitration to efficiently operate various system interfaces. The input/output controller hub 413 may be coupled to the input/output hub 412 via an internal bus, such as a direct media interface (DMI), a hub interface, an enterprise Southbridge interface (ESI), PCIe, etc.

The input/output controller hub 413 may provide various interfaces to connect with peripheral devices. For example, the input/output controller hub 413 may provide a universal serial bus (USB) port, a serial advanced technology attachment (SATA) port, a general purpose input/output (GPIO)

port, a low pin count (LPC) bus, a serial peripheral interface (SPI), a peripheral component interconnect (PCI) bus, PCIe, etc.

The network device 416 may receive data from the processor 411 and the graphics card 415 through the PCIe of the input/output hub 412 or one of the USB port, the SATA port, the GPIO port, the LPC bus, the SPI, the PCI bus, or the PCIe bus of the input/output controller hub 413. The network device 416 may transmit the data to another computing system. The network device 416 may receive other data from the other computing system. For example, the network device 416 may communicate with a server 430 through a network channel 420. The network channel 420 and the server 430 may correspond to the network channel 320 and the server 330 of FIG. 8.

According to exemplary embodiments of the inventive concept, the processor 411, the input/output hub 412, and the input/output controller hub 413 may be implemented as separate chipsets or separate integrated circuits. According to exemplary embodiments of the inventive concept, at least two of the processor 411, the input/output hub 412, and the input/output controller hub 413 may be implemented as a single chipset.

The present inventive concept may be applied to any devices and systems including a memory device. For example, as described above, the present inventive concept may be applied to systems such as a mobile phone, a smart phone, a PDA, a PMP, a digital camera, a camcorder, a PC, a server computer, a workstation, a laptop computer, a digital TV, a set-top box, a portable game console, a navigation system, etc.

As described above, the memory diagnosis system, according to exemplary embodiments of the inventive concept, may monitor information of the memory device to provide the information to the central server through the communication channel. The state of the memory device may be diagnosed by the central server based on the information. The memory diagnosis system may also warn the user of the danger of malfunction of the memory device so that the user may respond accordingly, such as by replacing the memory device. The operational condition of the memory device may be optimized based on its usage pattern and the collected information may be used as test data to design other memory devices.

While the inventive concept has been shown and described with reference to exemplary embodiments thereof, it will be understood by those of ordinary skill in the art that various modifications in form and details may be me made thereto without departing from the spirit and scope of the present inventive concept as defined by the following claims.

What is claimed is:

1. A memory diagnosis system comprising:
 a plurality of memory devices, each comprising:
  a memory module configured to adjust operational parameters in response to a parameter control signal;
  a memory controller configured to generate the parameter control signal in response to a feedback signal; and
  a memory state monitor configured to monitor the memory module to generate an information signal that includes information on a state of the memory module; and
 a server configured to generate the feedback signal in response to the information signal.

2. The memory diagnosis system of claim 1, wherein the information on the state of the memory module includes a temperature of the memory module, a humidity of the memory module, or information of program, erase, or read commands applied to the memory module.

3. The memory diagnosis system of claim 1, wherein the information on the state of the memory module includes a present program and erase cycle number, a bit error rate in a read operation, a program time, or an execution number of defense codes.

4. The memory diagnosis system of claim 1, wherein the parameter control signal includes a direct current (DC) characteristic control signal and an alternating current (AC) characteristic control signal.

5. The memory diagnosis system of claim 1, wherein
 when the information signal indicates that program commands are applied to the memory module at a frequency lower than a low threshold frequency, the server determines that a usage pattern of the memory module is a low frequency program pattern and generates the feedback signal to correspond to the low frequency program pattern, and
 in response to that feedback signal, the memory controller increases a program voltage for programming data in the memory module.

6. The memory diagnosis system of claim 1, wherein
 when the information signal indicates that program commands are applied to the memory module at a frequency higher than a high threshold frequency, the server determines that a usage pattern of the memory module is a high frequency program pattern and generates the feedback signal to correspond to the high frequency program pattern, and
 in response to that feedback signal, the memory controller decreases a program voltage for programming data in the memory module.

7. The memory diagnosis system of claim 1, wherein when the information signal indicates that a bit error rate in a read operation exceeds a reference value and the read operation is failed, a first memory device, among the plurality of memory devices, omits a first defense code and performs a second defense code.

8. The memory diagnosis system of claim 1, wherein the server comprises:
 an information collector configured to collect the information on the state of the memory module in response to the information signal; and
 a central processing unit configured to generate the feedback signal in response to the collected information.

9. The memory diagnosis system of claim 8, wherein the collected information is test information.

10. The memory diagnosis system of claim 1, further comprising:
 a communication channel connecting the plurality of memory devices and the server,
 wherein the memory state monitor of a first memory device transfers the information signal through the communication channel to the server, and the server transfers the feedback signal through the communication channel to the first memory device.

11. The memory diagnosis system of claim 10, wherein the communication channel is an internet network or a cloud network.

12. A memory diagnosis system comprising:
 a memory device comprising:
  a memory module; and
  a memory state monitor configured to monitor the memory module to generate an information signal that includes information on a state of the memory module and configured to generate a malfunction alert of the memory module in response to a feedback signal; and a server configured to receive the information signal and configured to generate the feedback signal, which indicates a malfunction of the memory module, by using the information on the state of the memory module.

13. The memory diagnosis system of claim 12, wherein the information on the state of the memory module includes a present program and erase cycle number, a bit error rate in a read operation, a program time, or an execution number of defense codes.

14. The memory diagnosis system of claim 12, wherein when the server determines that a bit error rate is higher than a predetermined threshold, the server outputs the feedback signal.

15. A method of diagnosing a memory module included in a memory device, the method comprising:

determining a bit error rate from an information signal transmitted from the memory device;

determining whether the bit error rate is higher than a first reference value;

activating a feedback signal to warn of a danger of malfunction of the memory module when the bit error rate is higher than the first reference value; and transmitting the feedback signal to the memory device, wherein the information signal transmitted from the memory device includes a present program and erase cycle number of the memory module, a program time of the memory module, or an execution number of defense codes of the memory module.

16. The method of claim 15, the method further comprising:

determining whether the bit error rate is higher than a second reference value, wherein the second reference value indicates a failure of a read operation;

performing a first defense code to change a read voltage based on values in a lookup table when the bit error rate is higher than the second reference value;

retrying the read operation with the changed read voltage; and performing a second defense code to find another read voltage when retrying the read operation fails.

17. The method of claim 15, the method further comprising:

determining whether the bit error rate is higher than a second reference value or a third reference value, wherein the second reference value indicates a failure of a read operation and the third reference value is higher than the second reference value;

performing a first defense code to change a read voltage based on values in a lookup table when the bit error rate is between the second reference value and the third reference value and retrying the read operation with the changed read voltage; and performing a second defense code to find another read voltage when retrying the read operation fails or the bit error rate is higher than the third reference value.

18. The method of claim 15, the method further comprising:

determining, from the information signal transmitted from the memory device, a frequency that program commands are applied to the memory module;

comparing the frequency to a first threshold frequency and a second threshold frequency;

generating the feedback signal to correspond to a low frequency program pattern when the frequency is less than the first threshold frequency;

generating the feedback signal to correspond to a high frequency program pattern when the frequency is greater than the second threshold frequency;

increasing a program voltage when the feedback signal corresponds to the low frequency program pattern; and decreasing the program voltage when the feedback signal corresponds to the high frequency program pattern.

\* \* \* \* \*